United States Patent
Gregory et al.

(10) Patent No.: US 6,444,293 B1
(45) Date of Patent: Sep. 3, 2002

(54) BUS BAR APPLICATION METHOD

(75) Inventors: Christopher C. Gregory, Newtown, PA (US); Harry L. Pinch, Princeton, NJ (US); John E. Smarto, Trafford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/052,384

(22) Filed: Mar. 31, 1998

(51) Int. Cl.⁷ .............................................. B32B 23/02
(52) U.S. Cl. ..................... 428/192; 428/194; 351/42; 351/168; 351/174; 351/177; 351/178; 359/244; 359/273; 359/275
(58) Field of Search .................. 428/192, 194; 359/275, 274, 265, 266, 267, 271, 273, 269, 241; 351/49, 42, 174, 168, 177, 178

(56) References Cited

U.S. PATENT DOCUMENTS

| | | | |
|---|---|---|---|
| 3,630,603 A | * 12/1971 | Letter | 351/44 |
| 4,335,938 A | 6/1982 | Giglia et al. | 350/357 |
| 5,327,281 A | 7/1994 | Cogan et al. | 359/270 |
| 5,520,851 A | 5/1996 | Yu et al. | 252/518 |
| 5,618,390 A | 4/1997 | Yu et al. | 204/192.26 |
| 5,657,150 A | * 8/1997 | Kallman et al. | 359/275 |

OTHER PUBLICATIONS

"Handbook of Thin Film Technology", Maissel and Glang (1970).

"Silicon Processing for the VLSI Era", vol. 1, Wolf and Tauber (1986).

* cited by examiner

Primary Examiner—Merrick Dixon
(74) Attorney, Agent, or Firm—Dennis G. Millman; William C. Mitchell

(57) ABSTRACT

A method for applying a bus bar to the peripheral edge region of a shaped substrate is disclosed. The method involves: 1) applying a protective coating to a blank substrate; 2) edging the blank substrate to shape; 3) applying a conductive coating to the peripheral edge region of the shaped substrate; and 4) removing the protective coating, along with excess conductive material.

28 Claims, 1 Drawing Sheet

BUS BAR APPLICATION METHOD

FIELD OF THE INVENTION

This invention relates to a lift-off method for applying conductive material to shaped substrates which are preferably used to prepare electrooptic devices, and to various metallized substrates. More specifically, a bus bar is applied to the peripheral edge region of a shaped substrate, such as a shaped optical lens, by coating one or more expanse surfaces of a blank substrate with a sacrificial protective film, grinding the peripheral edge region of the coated blank substrate to form a coated, shaped substrate and applying a conductive bus bar material to the peripheral edge region of the coated and shaped substrate. The sacrificial protective film, along with any conductive material applied beyond the bus bar target area (i.e., the peripheral edge region) of the coated and shaped substrate, is then removed, preferably via a solvent lift-off step, leaving a bus bar which is confined to the peripheral edge region of the shaped substrate. This method is particularly useful in preparing lenses for electrochromic eyewear.

BACKGROUND OF THE ART

The transmittance properties of electrochromic materials change in response to electrically driven changes in oxidation state. Thus, when an applied voltage from an external power supply causes electrons to flow to (reduction) or from (oxidation) an electrochromic material, its transmittance properties change. In order to maintain charge neutrality, a charge balancing flow of ions in the electrochromic device is needed. By enabling the required electron and ion flows to occur, an electrochromic device facilitates reversible oxidation and reduction reactions during optical switching.

Conventional electrochromic cells comprise at least one thin film of a persistent electrochromic material, i.e. a material responsive to the application of an electric field of a given polarity to change from a high-transmittance, non-absorbing state to a low-transmittance, absorbing or reflecting state. Since the degree of optical modulation is directly proportional to the current flow induced by an applied voltage, electrochromic devices demonstrate light transmission tunability between high-transmittance and low-transmittance states. In addition, these devices exhibit long-term retention of a chosen optical state, requiring no power consumption to maintain that optical state. Optical switching occurs when an electric field of reversed polarity is applied.

To facilitate the aforementioned ion and electron flows, an electrochromic film which is both an ionic and electronic conductor is in ion-conductive contact, preferably direct physical contact, with an ion-conducting material layer. The ion-conducting material may be inorganic or organic, solid, liquid or gel, and is preferably an organic polymer. The electrochromic film(s) and ion-conductive material are disposed between two electrodes, forming a laminated cell. As voltage is applied across the electrodes, ions are conducted through the ion-conducting material.

When the electrode adjacent to the electrochromic film is the cathode, application of an electric field causes darkening of the film. Reversing the polarity causes reversal of the electrochromic properties, and the film reverts to its high-transmittance state. Typically, an electrochromic film such as tungsten oxide is deposited on a substrate coated with an electroconductive film such as tin oxide or indium tin oxide to form one electrode. The counter electrode is typically a similar tin oxide or indium tin oxide coated substrate.

An electrochromic device also requires a means for delivering electrical current from a power source to each of its electrodes. This can be accomplished via use of a bus bar, as disclosed in U.S. Pat. Nos. 5,520,851 and 5,618,390 to Yu, et al.

U.S. Pat. No. 4,335,938 to Giglia discloses electrochromic devices having a layer of tungsten oxide in contact with a layer of organic electrolyte resin and an electrode means for changing the electrochromic properties of the device.

U.S. Pat. No. 3,630,603 to Letter discloses an electrochromic eyewire control circuit and U.S. Pat. No. 4,991,951 to Mizuno discloses metal eyeglass frames used in conjunction with electrooptic lenses.

U.S. Pat. No. 5,327,281 to Cogan discloses the use of epoxy to seal a cavity formed when a spacer is used to separate electrodes and contain a liquid electrolyte injected between the spaced electrodes.

U.S. Pat. No. 5,657,150 to Kallman, et al., discloses electrochromic devices and the use of contacts connecting first and second electrodes to flex circuits or other means of wiring.

Also, lift-off technology is utilized for patterning in the semiconductor and photolithography industries. See, for example, "Handbook of Thin Film Technology" by Maissel and Glang (1970) and "Silicon Processing for the VLSI Era", Volume 1, by Wolf and Tauber (1986).

SUMMARY OF THE INVENTION

This invention is directed to a novel method for applying a conductive bus bar to a shaped substrate. The resulting metallized substrates are particularly useful in the preparation of electrooptic devices, such as electrochromic devices.

As used herein, the term 'bus bar' refers to a strip, coating or band of low resistance electrically conductive material affixed to a substrate. Preferably, a bus bar is in electrical contact with an electroconductive material which is also on the substrate. As such, bus bars can be used to distribute electrical current from a power source across an electroconductive film. The term 'shaped substrate', as used herein, refers to a substrate prepared by grinding or cutting the perimeter of an oversized blank substrate to a smaller size having a desired shape. This grinding process is commonly referred to as edging. For ophthalmic lenses, disk-shaped, oversized blank lenses are edged to shape via conventional techniques well known to skilled practitioners.

A bus bar preferably is applied to the peripheral edge region of a shaped substrate having or which will have an electroconductive film on an adjacent expanse surface (hereinafter referred to as an electroconductive expanse surface). Electrical contact between a bus bar and an electroconductive film is preferably made at the interface of the peripheral edge region and an electroconductive expanse surface of a given substrate by causing the electroconductive film on the expanse surface to overlap the bus bar, or vice versa. It is desirable that a bus bar have a lower electrical resistance than the electroconductive film that it contacts.

In the preparation of an electrochromic device comprising an ophthalmic lens having at least one electroconductive expanse surface, a bus bar is preferably applied to the peripheral edge region of a shaped eyewear lens having or which will have a metal or metal oxide (e.g., fluorine-doped tin oxide, tin-doped indium oxide, antimony-doped tin oxide, aluminum-doped zinc oxide, etc.) electroconductive film on an adjacent expanse surface. Because the bus bar on such a lens is confined to its ground peripheral edge region, it is unobtrusive.

To avoid application of bus bar material beyond the targeted surface of a given substrate, the substrate can be mechanically masked so that only the desired bus bar surface is exposed during bus bar application. Such masking techniques are cumbersome because, inter alia, many masks may be needed (i.e., a different mask for each type and size of substrate); size variations in the substrates may cause bus bars to be oversized, undersized and/or displaced and it may be difficult or inefficient to remove masks from the substrates.

To overcome these deficiencies of mechanical masking, the instant invention is directed to a lift-off method wherein a removable protective coating, for example a coating which is solubilized, stripped or swelled by the action of a liquid agent, is applied to an oversized blank substrate having a peripheral edge region situated between first and second expanse surfaces, such as a blank optical lens. Depending on the coating method employed, a protective coating can be applied to all surfaces of a blank substrate, or the sacrificial coating can be limited to one or both of the substrate's expanse surfaces. Preferably, all non-targeted surfaces prone to contact by conductive material during a subsequent bus bar application step are coated with a sacrificial film.

The peripheral edge region of the coated blank substrate is then ground to shape via a conventional edging technique, leaving a sacrificial coating on one or both of the expanse surfaces of the resulting shaped substrate. A conductive material is then applied to the ground edge region of a coated and shaped substrate to form a bus bar. Excess conductive material applied beyond the bus bar target area of a coated and shaped substrate contacts expanse surfaces covered by a protective coating. The resulting coated, shaped and metallized substrate is then exposed to an agent, such as a solvent, which removes or facilitates removal of the chosen protective coating, optionally utilizing agitation, mechanical action and/or heat as needed. Removal of the protective coating also causes the conductive material deposited thereon to be lifted-off of the non-targeted surfaces of the shaped substrate, leaving a bus bar which is confined to the edged peripheral edge region of a shaped substrate. If it is desired to limit a bus bar to a portion of the peripheral edge region of a shaped substrate, a protective coating can be applied to the non-targeted portion of that edge region after the edging step.

DETAILED DESCRIPTION OF THE INVENTION

Figure 2:
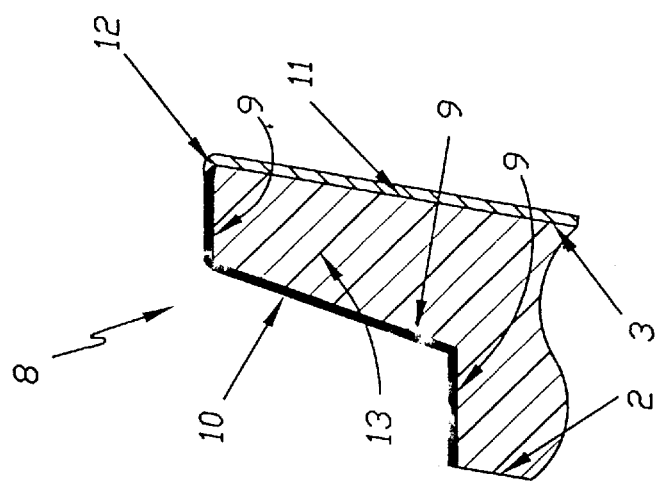
FIG. 2 is a cross-sectional view of a shaped substrate containing a bus bar on its peripheral edge region and an electroconductive film on an adjacent expanse surface.

Other than in the operating Example, or where otherwise indicated, all numbers quantifying ingredients, amounts, dimensions, reaction conditions, etc., used herein are to be understood as modified in all instances by the term 'about'.

In general terms, the instant invention is directed to a method for applying a bus bar to a substrate having a peripheral edge region adjacent to first and second expanse surfaces, which method comprises: a) applying a protective coating to one or both of said expanse surfaces, thereby producing a coated substrate; b) edging the coated substrate of step a), thereby producing a coated substrate having an edged peripheral edge region; c) applying a conductive material to said edged peripheral edge region; and d) removing the protective coating, along with any conductive material applied thereon.

More particularly, the instant invention is directed to a method for applying a bus bar-forming conductive material to all or a portion of the peripheral edge region of a shaped substrate which has been cut, ground or otherwise prepared from an oversized blank substrate having an uncut peripheral edge region situated between first and second expanse surfaces, which method comprises: a) applying a sacrificial or removable, preferably a soluble, swellable or strippable, protective coating to one or both of the expanse surfaces of said blank substrate, preferably to all expanse surfaces likely to contact said conductive material during a subsequent bus bar application step; b) edging, for example by cutting, grinding or otherwise shaping the uncut peripheral edge region of the coated blank substrate of step a) to shape, thereby forming a coated and shaped substrate having a ground peripheral edge region situated between one or more coated expanse surfaces; c) applying a conductive bus bar material to the peripheral edge region of said coated and shaped substrate; and d) removing said protective coating, and any conductive material positioned thereon, from said coated strips and shaped substrate, preferably via use of an agent such as a solvent, swelling or stripping compound which solubilizes, swells, strips or otherwise facilitates removal of said protective coating. In a preferred embodiment, the blank substrate is an optical lens; in a more preferred embodiment, the blank substrate is an ophthalmic lens which can be used in the preparation of an electrochromic device.

The instant invention is also directed to a shaped substrate having a bus bar confined to some or all of its peripheral edge region which is prepared via the instant method. Such a substrate may ultimately be used to prepare a single stack electrooptic device, wherein electrodes, electrochromic material(s) and an ion-conducting material are coated as a stack on a first substrate which may or may not be laminated to a second substrate, or to prepare a device wherein the electrodes are coated on first and second substrates, which are then laminated. Multiple bus bars can be applied to a single substrate, if necessary. Preferred substrates are optical lenses.

Any sacrificial or removable protective coating which is compatible with and adheres to the substrate being treated and which can be lifted off via use of a suitable agent can be used as a protective coating. For example, polymer coatings or films of cellulose nitrate prepared from Dykem DX296, which is commercially available from Dykem Company, St. Louis, Mo., are suitable for use on various substrates. Additional polymeric materials which are acceptable include, but are not limited to, various substituted polystyrenes and polymethylmethacrylates. These materials are generally less desirable than cellulose nitrate films due to the nature of their solvents, which may include components such as xylene and higher molecular weight ketones. Preferred sacrificial materials are shellac-based, including but not limited to industrial shellac (28.8% solids in 190 proof alcohol) and ammoniated shellac (25% solids in a dilute aqueous ammonium hydroxide solution) available from Mantrose Bradshaw Zinsser Group, Westport, Conn.

An effective protective coating is applied. This means that the protective coating applied to a given substrate is of sufficient thickness and coverage to protect all non-targeted surfaces prone to contact with a conductive material during bus bar application. A removable protective coating can be applied to a blank substrate by any suitable means, for example, by spin, dip or spray coating. Such coating means are readily known to skilled practitioners. Drying may be desirable to facilitate curing, or to drive carrier solvents off of the protective layer. Coating thicknesses generally range from 0.05 to 1.5 mils, preferably from 0.1 to 0.6 mils.

While it is preferred to only apply a removable protective coating to the expanse surfaces of blank substrates likely to be exposed to a conductive material during bus bar application, protective coatings can also be applied to the peripheral edge region of a blank substrate. This occurs if, for example, a dip coating technique is utilized. In such cases, the protective coating will be removed from the peripheral edge region of a blank substrate when it is ground to shape. Another embodiment of the instant invention contemplates addition of a protective coating to a portion of the ground peripheral edge region of a coated and shaped substrate. This technique may be utilized in instances where it is desired to limit a bus bar to a specific area of the peripheral edge region of a shaped substrate.

After applying an effective protective coating to the expanse surfaces of an oversized blank substrate, the bus bar target surface, i.e., the peripheral edge surface of a shaped substrate, is exposed by removing excess substrate material from the blank substrate. For optical lenses, this can be accomplished by conventional edging techniques. After edging, the protective coating remains on the expanse surfaces of the shaped substrate to protect those surfaces against conductive material applied beyond the bus bar target area.

The cross-sectional profile of the peripheral edge region of a shaped substrate to which a conductive material is applied is not believed to be critical; the peripheral edge region profile can be, for example, flat, V-shaped, U-shaped, mesa shaped, square shaped, rounded or irregularly shaped. However, it may be desirable to avoid sharp edges in some applications, as they tend to concentrate stress. For this reason, mesa-shaped edges having rounded corners are preferred in electrochromic applications.

A preferred embodiment of this invention requires that an oversized blank substrate be edged after application of a sacrificial protective coating to form a rounded or sloped transition zone linking its peripheral edge region and its electroconductive expanse surface. In the case of an ophthalmic lens used to prepare a laminated electrochromic lens, it is also preferred that the peripheral edge region of the shaped lens include a peripheral nub adjacent to its electroconductive expanse surface. Such nubs are preferred bus bar foundations; if a nub is rounded, it also facilitates contact between a bus bar and the electroconductive film on an adjacent electroconductive expanse surface by providing a curved transition zone linking the peripheral edge region and the electroconductive expanse surface. The nub can also be used to interlock with an edge seal.

After edging, a conductive material is applied as a bus bar to the peripheral edge region of a coated and shaped substrate. Any suitable conductive material can be used to form a bus bar, including, for example, noble metals, gold ink and conductive epoxies. Preferred conductive materials include low resistivity metals such as gold, copper, chromium, tungsten, molybdenum and silver, alone or in combination. Gold (about 1000 to about 8000 Å thick) over chromium (about 100 to about 1000 Å thick) bus bars are preferred.

An effective amount of conductive material is applied, i.e., that amount necessary to provide a bus bar of desired thickness and electrical resistance. Conductive materials can be applied via any conventional means, including, but not limited to, plating, rolling, brush application, vacuum evaporation and vacuum sputtering. Gold, copper, chromium or other conductive material metallization is preferably effectuated using vacuum, evaporation or sputter deposition techniques.

After application of a bus bar to a given coated and shaped substrate, conductive material applied beyond the substrate target area (i.e., that which lands on an expanse surface protective coating) and the protective coating are removed from the coated and shaped substrate via a suitable lift-off technique. Any agent which facilitates removal of a sacrificial protective from the instant substrates can be used, including agents which solubilize, strip, swell or loosen a protective coating from a substrate. A preferred lift-off agent is a solvent which solubilizes a given protective coating. For example, a shellac-based protective coating can be solubilized in an aqueous alkaline bath; such baths remove both the shellac-based coating and conductive material deposited thereon. For shellac-based films, dilute ammonia hydroxide solutions, dilute sodium carbonate solutions and denatured alcohol are preferred lift-off solvents. If a cellulose nitrate film is used, ethyl alcohol is a suitable lift-off solvent. Complete lift-off generally can be achieved by placing a substrate in a solvent bath for an effective time, usually 0.5 to 20 minutes. Ultrasonic agitation may be used to enhance lift-off efficacy. After coating lift-off, the resulting product is a shaped substrate having a clearly delineated conductive bus bar coating on its peripheral edge region. Washing/rinsing steps may be utilized as needed and residual conductive material in a lift-off bath may be recovered via conventional techniques.

Though the instant method is believed to be applicable to virtually any substrate, the preferred substrates of the instant invention are glass or organic polymeric substrates conventionally used to prepare optical lenses or electrochromic articles or devices. Preferably, polymeric organic substrates are used. For optical applications, substrates of the present invention are preferably prepared from transparent materials suitable for producing eyewear lenses, such as lenses prepared from synthetic organic optical resins are suitable. Alternatively, the substrate can be a non-transparent solid material.

Suitable transparent lenses may have a conventional refractive index (1.48–1.5), a relatively high refractive index (1.60–1.75), or a mid-range refractive index (1.51–1.59), depending on the end use. In general terms, a transparent lens may have a refractive index within the range of between 1.48 and 1.75, e.g., from about 1.50 to about 1.8.

Synthetic polymer substrates that may be used as a lens material include, but are not limited to: thermoplastic polycarbonates, such as the carbonate-linked resin derived from bisphenol A and phosgene, which is sold under the trademark LEXAN; polyesters, such as the material sold under the trademark, MYLAR; poly(methylmethacrylates), such as the material sold under the trademark, PLEXIGLAS; and polymerizates of a polyol(allyl carbonate) monomer, especially diethylene glycol bis(allyl carbonate), which is sold by PPG Industries, Inc., as CR-39® monomer. Copolymers of the aforedescribed monomers/resins may also be used as a lens material. These and other transparent and non-transparent polymeric substrates known in the art for use for various optical and non-optical applications may be used.

After bus bar application and solvent lift-off, the resulting metallized substrate is preferably treated by applying an electroconductive film to at least one of its expanse surfaces. Thus, an electroconductive film is preferably applied to an expanse surface adjacent to the bus bar-containing peripheral edge region of a given device by any suitable means. The electroconductive film preferably overlaps the bus bar, thereby providing electrical contact. Tin-doped indium oxide films are preferred electroconductive films, particularly those having an indium to tin weight ratio of about 90:10.

Laminated electrochromic eyeglass lenses can be prepared by bonding first and second lenses together, wherein each lens comprises an edged, transparent substrate which contains an electroconductive film and a bus bar. Electrochromic films are present on one or both of the lenses. Bonding is preferably accomplished by placing an effective amount of a curable ion-conducting polymer (ICP) composition, i.e. a monomer solution comprising one or more monomers and effective amount of an initiator and optionally up to one or more non-reactive diluents and/or additives, on the concave interface surface of a matched lens pair and bringing this concave surface and the convex surface of the corresponding lens together by a suitable technique, thereby spreading the curable adhesive composition between the lenses. The curable ICP composition is then cured via exposure to a suitable energy source. Curing of the polymer places an ion-conducting polymer between the lenses while bonding the lenses into a laminate, thereby facilitating necessary ion flow.

Figure 1:
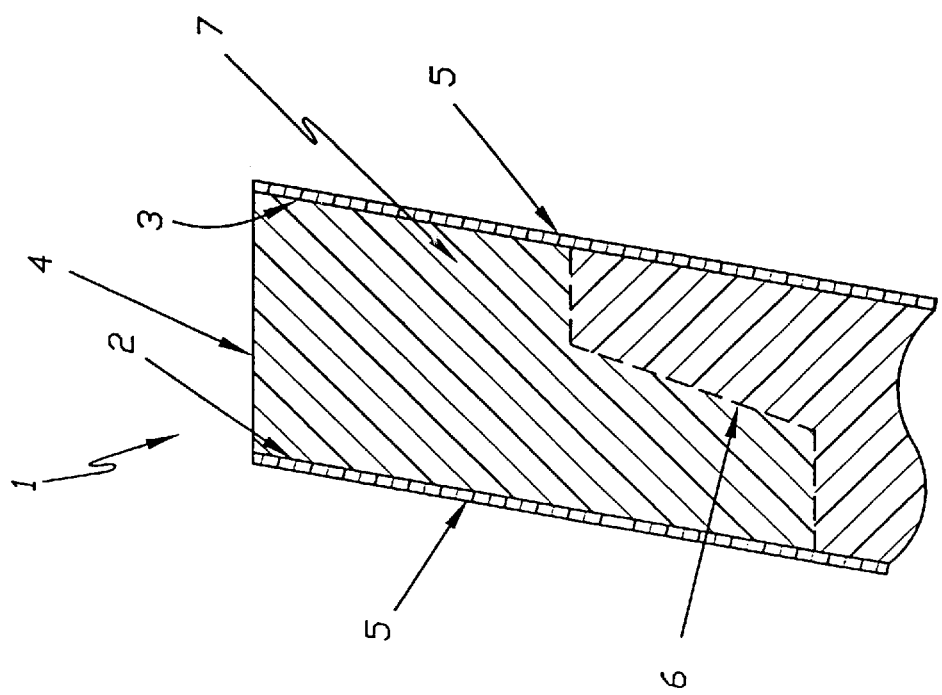
FIG. 1 is a cross-sectional view of a blank substrate having a sacrificial protective film on its expanse surfaces.

The best mode known to the inventors is now described by reference to FIGS. 1 and 2, which are not drawn to scale. FIG. 1 shows a cross-sectional view of blank lens 1 containing sacrificial protective layers 5 on first and second expanse surfaces 2 and 3. Uncut peripheral edge region 4 is situated between expanse surfaces 2 and 3. Final edge line 6 marks excess portion 7 of blank lens 1 removed during edging to form shaped lens 8 as shown in FIG. 2.

Protective coatings 5 are applied to expanse surfaces 2 and 3 of blank lens 1 via a conventional coating method. Blank lens 1 containing protective coatings 5 on expanse surfaces 2 and 3 is then edged via a conventional edging technique to form shaped lens 8 having peripheral edge region 9. After edging, protective coatings 5 remain on expanse surfaces 2 and 3 of shaped lens 8. Coatings 5 are not shown in FIG. 2.

Conductive bus bar material is then applied to peripheral edge region 9 of shaped lens 8 via a conventional application technique to form bus bar 10. Excess conductive bus bar material applied beyond the bus bar target area (i.e., peripheral edge region) lands on protective coatings 5 on expanse surfaces 2 and 3. After application of the conductive bus bar material, shaped lens 8 is placed in a solvent bath for an effective time, generally between 5 and 10 minutes, to lift off protective coatings 5 and excess conductive bus bar material positioned thereon. Ultrasonic agitation in the bath is preferred. Removal of shaped lens 8 from the bath and rinsing complete the metallization process, resulting in bus is bar 10 on peripheral edge region 9 of shaped lens 8.

Electroconductive film 11 can then be applied via a conventional coating technique to expanse surface 3 of shaped and metallized lens 8. Shaped lens 8 contains peripheral nub 13, which provides a rounded transition zone 12 between peripheral edge region 9 and expanse surface 3 containing electroconductive film 11. Bus bar 10 and electroconductive film 11 overlap in transition zone 12 to provide electrical contact.

EXAMPLE

The present invention is more particularly described in the following Example, which is intended to be illustrative only since numerous modifications and variations therein will be apparent to those skilled in the art.

Application of a Bus Bar to a Blank Substrate

A 1–2 mm thick clear optical lens blank 1 prepared from CR-39® monomer having uncut circumferential edge region 4 between first and second expanse surfaces 2 and 3 was treated to provide a gold over chromium bus bar 10 via the instant lift-off method.

Expanse surfaces 2 and 3 of blank lens 1 were coated with industrial shellac using a Specialty Coating Supplies, Inc., Model 493-005 portable spin coater. Lens 1 was then oven dried at 40–45° C. for 60 minutes to drive off carrier solvents. This process resulted in protective coatings 5 on expanse surfaces 2 and 3. These coatings had film thickness of about 0.4 mils.

After application of protective coatings 5 to expanse surfaces 2 and 3, blank lens 1 was edged to shape using a Gerber Elite edger; this process formed shaped lens 8 having peripheral edge region 9 between coated expanse surfaces 2 and 3. Nub 13 was formed during the edging step. Protective coatings 5 remained on expanse surfaces 2 and 3 of shaped lens 8 after edging.

Peripheral edge region 9 of shaped lens 8 was coated with chromium and gold films, 1000 and 6000 Åthick, respectively, using conventional sputter deposition techniques. Coating lift-off was then accomplished by placing shaped lens 8 in a dilute ammonia water bath for 10 to 15 minutes; this lift-off method confined gold over chromium bus bar 10 to peripheral edge region 9 of shaped lens 8. After rinsing, an indium-tin oxide electroconductive layer 11 was deposited onto surface 3 of shaped lens 8 via the technique of U.S. Pat. No. 5,618,390. Electroconductive film 11 overlapped bus bar 10 at sloped transition zone 12 on nub 13.

We claim:

1. A method for applying a conductive material to a substrate having a peripheral edge region adjacent to first and second expanse surfaces, which method comprises: a) applying a protective coating to one or both of said expanse surfaces, thereby producing a coated substrate; b) edging said coated substrate, thereby producing a coated substrate having an edged peripheral edge region; c) applying said conductive material to said edged peripheral edge region; and d) removing said protective coating, along with any conductive material applied thereon.

2. The method of claim 1, wherein said substrate is an optical lens.

3. The method of claim 2, wherein said optical lens is an ophthalmic lens.

4. The method of claim 1, wherein said protective coating is shellac-based.

5. The method of claim 3, wherein said protective coating is shellac-based.

6. The method of claim 1, wherein said conductive material is a low resistivity metal.

7. The method of claim 3, wherein said conductive material is a low resistivity metal.

8. The method of claim 1, wherein edging forms a rounded or sloped transition zone linking said edged peripheral edge region to an adjacent expanse surface containing an electroconductive film.

9. The method of claim 3, wherein edging forms a rounded or sloped transition zone linking said edged peripheral edge region to an adjacent expanse surface containing an electroconductive film.

10. The method of claim 8, wherein said edged peripheral edge region contains a nub.

11. The method of claim 9, wherein said edged peripheral edge region contains a nub.

12. The method of claim 6, wherein said conductive material contacts an electroconductive film applied to one of said adjacent expanse surfaces.

13. The method of claim 7, wherein said conductive material contacts an electroconductive film applied to one of said adjacent expanse surfaces.

14. A bus bar-containing substrate prepared by the method of claim 1.

15. An electrooptic device comprising a substrate having an edged peripheral edge region adjacent to an expanse surface, wherein said edged peripheral edge region contains a conductive material and said expanse surface contains an electroconductive film, wherein said conductive material and said electroconductive film overlap, and wherein said conductive material is applied according to the method of claim 1.

16. The substrate of claim 14, wherein said bus bar comprises a low resistivity metal.

17. The device of claim 15, wherein said conductive material comprises a low resistivity metal and wherein said electroconductive film is a metal or metal oxide film.

18. The device of claim 15, wherein said conductive material forms a bus bar.

19. The device of claim 15, wherein said substrate is an optical lens.

20. The device of claim 19, wherein said conductive material forms a bus bar.

21. The device of claim 17, wherein said conductive material extends to a rounded or sloped transition zone linking said peripheral edge region and said expanse surface.

22. The device of claim 20, wherein said bus bar extends to a rounded or sloped transition zone linking said peripheral edge region and said expanse surface.

23. The device of claim 22, when said bus bar comprises one or more conductive materials selected from the group consisting of gold, copper, chromium, tungsten, molybdenum and silver.

24. The device of claim 23, wherein said bus bar comprises gold over chromium.

25. The device of claim 24, wherein said electroconductive film comprises tin-doped indium oxide.

26. The device of claim 17, when said electroconductive film comprises tin-doped indium oxide.

27. An electrochromic device having a bus bar applied by the method of claim 1.

28. The device of claim 27, wherein said bus bar comprises at least one conductive material selected from the group consisting of gold, copper, chromium, tungsten, molybdenum and silver.

* * * * *